(12) United States Patent
Winter et al.

(10) Patent No.: US 12,334,832 B2
(45) Date of Patent: Jun. 17, 2025

(54) DUAL ACTIVE BRIDGE CONVERTER, VOLTAGE CONVERTER ARRANGEMENT AND METHOD FOR OPERATING A DUAL ACTIVE BRIDGE CONVERTER

(71) Applicant: Robert Bosch GmbH, Stuttgart (DE)

(72) Inventors: Christian Winter, Tamm (DE); Jan Riedel, Esslingen Am Neckar (DE)

(73) Assignee: Robert Bosch GmbH

( * ) Notice: Subject to any disclaimer, the term of this patent is extended or adjusted under 35 U.S.C. 154(b) by 260 days.

(21) Appl. No.: 18/009,404

(22) PCT Filed: May 25, 2021

(86) PCT No.: PCT/EP2021/063871
§ 371 (c)(1),
(2) Date: Dec. 9, 2022

(87) PCT Pub. No.: WO2021/249765
PCT Pub. Date: Dec. 16, 2021

(65) Prior Publication Data
US 2023/0223857 A1   Jul. 13, 2023

(30) Foreign Application Priority Data

Jun. 12, 2020   (DE) .................... 10 2020 207 325.2

(51) Int. Cl.
*H02M 3/335*      (2006.01)
*H02M 1/14*       (2006.01)

(52) U.S. Cl.
CPC ......... *H02M 3/33573* (2021.05); *H02M 1/14* (2013.01); *H02M 3/33584* (2013.01)

(58) Field of Classification Search
CPC ............. H02M 3/335; H02M 3/33573; H02M 3/33584; H02M 1/14
See application file for complete search history.

(56) References Cited

U.S. PATENT DOCUMENTS

| | | | | |
|---|---|---|---|---|
| 5,027,264 | A * | 6/1991 | DeDoncker | H02M 3/33584 363/27 |
| 6,624,619 | B2 * | 9/2003 | Fujita | H02M 7/4837 323/288 |
| 9,748,853 | B1 * | 8/2017 | Li | H02M 3/33546 |
| 9,893,633 | B1 * | 2/2018 | Li | H02M 1/14 |
| 10,693,399 | B2 * | 6/2020 | Yanagita | H02P 6/16 |
| 12,102,373 | B2 * | 10/2024 | Kato | A61B 18/1206 |
| 2001/0026180 | A1 * | 10/2001 | Aoki | H02P 7/2805 327/162 |

(Continued)

FOREIGN PATENT DOCUMENTS

| | | |
|---|---|---|
| EP | 3285382 A1 | 2/2018 |
| WO | WO-2019146018 A1 * | 8/2019 ..... A61B 17/320092 |

OTHER PUBLICATIONS

Translation of International Search Report for Application No. PCT/EP2021/063871 dated Aug. 18, 2021 (2 pages).

*Primary Examiner* — Gary L Laxton
(74) *Attorney, Agent, or Firm* — Michael Best & Friedrich LLP

(57) ABSTRACT

A dual active bridge converter is provided with a control variable that is superimposed with an additional ripple component to control the dual active bridge converter with a combination of the control variable and the additional ripple component.

17 Claims, 3 Drawing Sheets

(56) References Cited

U.S. PATENT DOCUMENTS

| | | | |
|---|---|---|---|
| 2011/0249472 A1* | 10/2011 | Jain | H02M 3/33584 363/15 |
| 2014/0185328 A1* | 7/2014 | Rosado | H02M 3/33507 363/17 |
| 2019/0148965 A1 | 5/2019 | Shin et al. | |
| 2020/0014293 A1* | 1/2020 | Zhang | H02M 1/14 |
| 2020/0266714 A1 | 8/2020 | Taylor et al. | |

* cited by examiner

DUAL ACTIVE BRIDGE CONVERTER, VOLTAGE CONVERTER ARRANGEMENT AND METHOD FOR OPERATING A DUAL ACTIVE BRIDGE CONVERTER

BRIEF DESCRIPTION OF THE DRAWINGS

The present invention relates to a method for operating a dual active bridge converter. The present invention also relates to a dual active bridge converter and a voltage converter arrangement comprising a dual active bridge converter.

Dual active bridge converters are bidirectional DC voltage converters comprising two semiconductor full-bridges. Because of their compactness, dual active bridge converters are advantageous in particular for applications with limited installation space. Dual active bridge converters moreover also enable galvanic electrical isolation between the two DC voltage sides. A detection method using dual active bridge converters is known from EP 3 285 382 A1, for instance.

Figure 1:
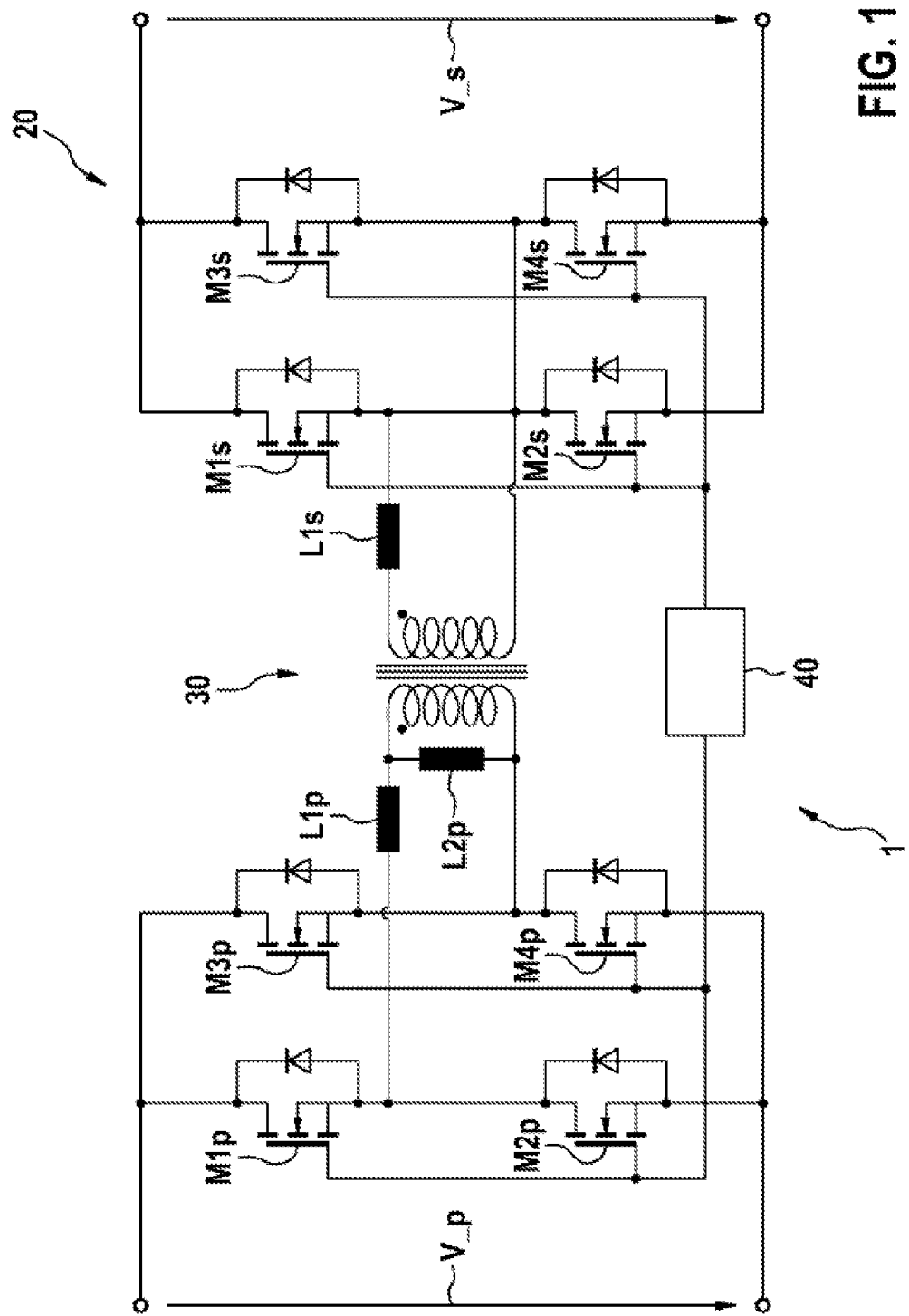

When operating dual active bridge converters, so-called dead-time effects can affect the controllability of the system. A dead time can generally be understood to mean the period of time between a signal change at the system input and a signal response at the system output. In the case of impressions, in particular as used for dual active bridge converters, a dead time corresponds to the time between switching off one switching element of the half-bridge and switching on the respective other switching element of the half-bridge. For dual active bridge converters, such dead times occur in the transition region between a hard-switching and a soft-switching operation. This transition region is also described as the dead time region.

SUMMARY OF THE INVENTION

The present invention provides a method for operating a dual active bridge converter, a dual active bridge converter, and a voltage converter arrangement.

Provided is therefore:

A method for operating a dual active bridge converter comprising a step for determining a control variable for the dual active bridge converter. The method further comprises a step for superimposing the control variable with a ripple component and a step for controlling the dual active bridge converter using the control variable superimposed with the ripple component.

Provided is furthermore:

A dual active bridge converter comprising a control device. The control device is designed to determine a control variable for the dual active bridge converter, to superimpose the control variable with a ripple component and to control the dual active bridge converter using the control variable superimposed with the ripple component.

Provided is lastly:

A voltage converter arrangement comprising at least one dual active bridge converter according to the invention.

Advantages of the Invention

The present invention is based on the insight that, in a dual active bridge converter, in a transition region between a hard-switching and a soft-switching operation, dead times in the control of the switching elements in the dual active bridge converter can lead to a stagnation of the manipulated variable or a self-amplification of the manipulated variable. For a reliable and stable regulation of the output variable of a dual active bridge converter, however, a continuous and strictly monotonic characteristic of the controlled system is required.

It is therefore an idea of the present invention to take this insight into account and to provide a control for a dual active bridge converter, which can counteract the dead time-related effects in the transition region between hard-switching operation and soft-switching operation of the dual active bridge converter. For this purpose, it is provided according to the invention to superimpose the control variable for the dual active bridge converter with an additional ripple component. This ripple component can be an alternating offset, for example a periodic signal. The frequency of the ripple can in particular be selected such that, on the one hand, the dual active bridge converter can follow the ripple-induced changes, but, on the other hand, there are no significant ripple-induced disruptions or fluctuations in the output variable of the dual active bridge converter. The specific frequency or the specific frequency range in which the ripple can move can therefore depend on the other operating parameters of the dual active bridge converter.

By superimposing the control variable for the dual active bridge converter with an additional ripple, the control variable is subjected to an offset, so that, for each value of the control variable, the dual active bridge converter is at least temporarily also operated outside the dead time region due to the superimposed ripple. Therefore, a sufficiently large amplitude has to be provided for the superimposed ripple.

In this way, it can be ensured that a strictly monotonic slope of the characteristic for the relationship between the control variable and the output variable is achieved, even in the dead time region of the dual active bridge converter.

If this strategy is used across the entire operating range, precise knowledge of the specific position of the dead time region of the dual active bridge converter is not required. This in particular makes it possible to achieve a high degree of robustness with respect to component tolerances.

According to one embodiment, the control variable includes a target value for an output current of the dual active bridge converter. The control variable can in particular relate to a phase shift between the control on the input side and the output side of the dual active bridge converter.

According to one embodiment, the ripple component includes a periodic quantity having a predetermined signal shape. The amplitude of the ripple component should be selected to be at least large enough that a stagnation of the manipulated variable when passing through the dead time region can be avoided.

According to one embodiment the predetermined signal shape of the ripple component can comprise a rectangular signal profile, a sinusoidal signal profile, a triangular signal profile, or a saw-toothed signal profile. Any other suitable signal profiles are furthermore possible as well. A rectangular signal profile, in particular, can be implemented very easily using a suitable digital signal. A sinusoidal signal profile, for instance, can moreover be used to minimize high-frequency interference components, if necessary.

According to one embodiment, the ripple component has a fixed predetermined frequency. The choice of a suitable frequency can depend on the other operating characteristics of the dual active bridge converter. The predetermined frequency should in particular be sufficiently high to avoid fluctuations in the output variable of the dual active bridge converter.

According to one embodiment, the frequency of the ripple component can be varied within a predetermined frequency range. The frequency can in particular be varied periodically within the predetermined frequency range. Further interference effects can be eliminated or at least reduced by varying the frequency for the ripple component.

According to one embodiment, the amplitude of the ripple component can be set using a current value of the control variable. For instance, the amplitude can be increased in a region within, or in a predetermined region, around the expected dead time region in the transition between hard-switching and soft-switching operation of the dual active bridge converter. Analogously, the amplitude of the ripple component can be decreased in regions that are further away from the expected dead time region. Any other schemes for adjusting an amplitude of the ripple component are of course also possible as well.

According to one embodiment of the voltage converter arrangement, the voltage converter arrangement can comprise a plurality of dual active bridge converters. In such a case, the control variable of the individual dual active bridge converters can be superimposed with different ripple components. Individual characteristics, such as the frequencies of the ripples or also the signal shapes of the ripples, can in particular be different for the individual dual active bridge converters.

The above configurations and further developments can be combined with one another in any desired manner if useful. Further configurations, developments and implementations of the invention also include not explicitly mentioned combinations of features of the invention described above or in the following with respect to the design examples. Those skilled in the art will in particular also add individual aspects as improvements or additions to the respective basic forms of the invention.

BRIEF DESCRIPTION OF THE DRAWINGS

Figure 2:
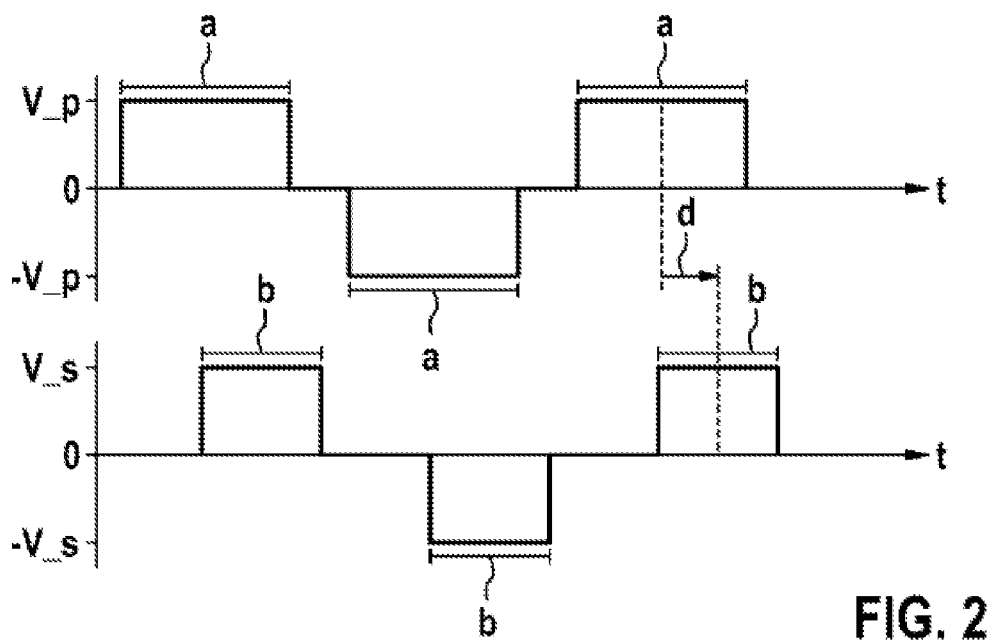
Figure 3:
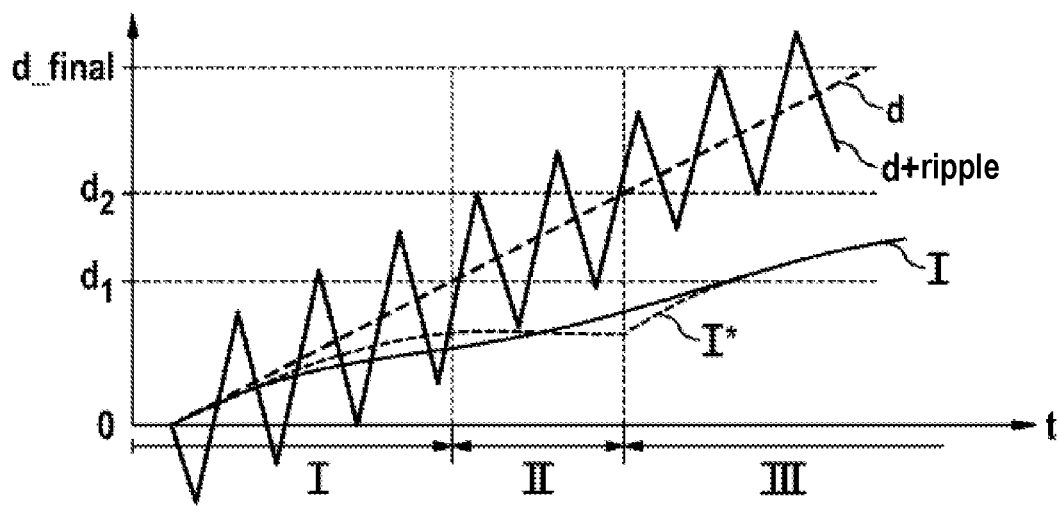
Figure 4:
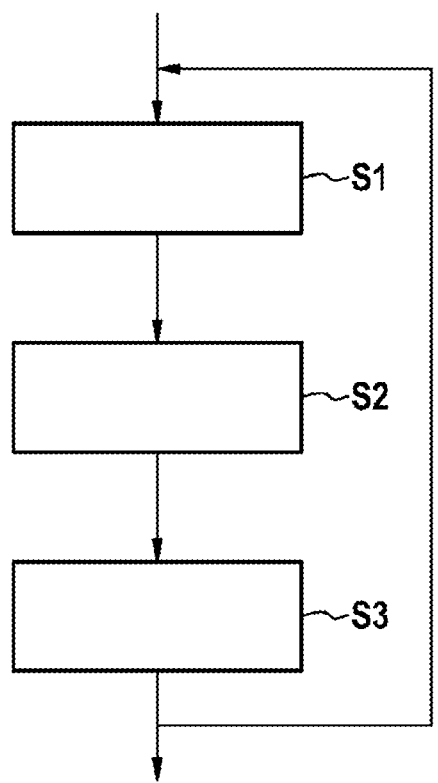

Further features and advantages of the invention are explained in the following with reference to the figures. The figures show:

FIG. 1: schematic illustration of a basic circuit diagram of a dual active bridge converter as it forms the basis of an embodiment of the present invention;

FIG. 2: schematic voltage curves during operation of a dual active bridge converter;

FIG. 3: a schematic illustration of an output current and the underlying control variable during operation of a dual active bridge converter according to one embodiment; and FIG. 4: a flowchart as it forms the basis of a method for operating a dual active bridge converter according to one embodiment.

DETAILED DESCRIPTION

FIG. 1 shows a schematic illustration of a dual active bridge converter 1 according to one embodiment. A primary side includes a first half-bridge comprising two switching elements M1$p$ and M2$p$, and a second half-bridge comprising two switching elements M3$p$ and M4$p$. A secondary side 20 likewise includes two half-bridges comprising the switching elements M1$s$ to M4$s$. A transformer region 30 between the primary side and the secondary side includes a first primary-side inductance L1$p$, a second primary-side inductance L2$p$, and a secondary-side inductance L1$s$. An input voltage V_p is provided on the primary side, which is converted into a secondary-side output voltage V_s by the dual active bridge converter 1. A control device 40 can be provided to control the switching elements M1$p$ to M4$p$ and M1$s$ to M4$s$. In addition to the embodiment of a dual active bridge converter 1 shown in FIG. 1, however, the principle of the present invention described in the following can also generally be applied to any other suitable DC voltage converter. The superimposition of a control variable with a ripple component according to the invention can in particular also be applied to other variations of dual active bridge converters. Such variations in particular include voltage converters that comprise only one half-bridge with a split input capacitor on the primary side and/or on the secondary side, for example. Multilevel configurations of the transistors to increase the input voltage or smooth the transformer voltages, for example, are furthermore possible as well. One or more of the inductances of the coupling network can moreover also be omitted, if necessary, or a secondary side shunt inductance can be implemented.

FIG. 2 shows a schematic illustration of the voltage curves during operation of the dual active bridge converter 1. As shown in the upper region of FIG. 2, the primary-side switching elements M1$s$ to M4$s$ provide a pulse-shaped voltage curve, wherein a time duration of a pulse is specified by a first phase angle a. Voltage pulses result on the secondary side, wherein a time duration of the secondary-side pulses is specified by a second phase angle b. A third phase angle d is given by a time shift between the central points of the voltage pulses on the primary side and the secondary side. The third phase angle d can in particular be varied as a control variable for an output current of the dual active bridge converter 1, for instance.

A continuous increase in the control variable, in particular the third phase angle d, leads to a stagnation of the output variable, in particular the output current, in a dead time region during the transition between the soft-switching operation and the hard-switching operation of the dual active bridge converter 1.

To counteract this effect and achieve as strictly monotonic an increase as possible over the dead time region, the control variable d can be superimposed with an additional ripple component. This ripple component can be a periodic signal having a specified frequency, for example. In this way, the control variable d will fluctuate periodically with the amplitude of the superimposed ripple. If the control variable d has a value D, for instance, and the amplitude of the superimposed ripple component is identified as A, the dual active bridge converter 1 is operated with a control variable in the range of D A. Selecting the amplitude A of the ripple component to be sufficiently large makes it possible to ensure that the control variable d is at least temporarily outside the dead time region for each value of the control variable d. In this way, a strictly monotonic, albeit possibly reduced, slope of the output variable can be achieved over the entire control range, in particular in the dead time region.

FIG. 3 illustrates this relationship and shows a temporal progression of the output variable in the form of an output current I and the underlying control variable d. The ripple component which is superimposed on the control variable d is shown here in a very simplified form and at a very low frequency. This low frequency is solely to make it easier to understand. In practice and in operational use, however, a significantly higher frequency will usually be selected for the superimposed ripple.

Region I in FIG. 3 identifies the hard-switching region, Region III the soft-switching region and Region II the dead time region in the transition between the hard-switching and the soft-switching region.

As can be seen in FIG. 3, there is also no stagnation of the output variable I in the dead time region between the first and second dashed lines. The progression of the output variable I*, on which the control variable d without superimposed ripples would be based, is shown for comparison as a dashed line.

As already stated above, the ripple component can be formed as a periodic signal having a fixed frequency. It is alternatively also possible to vary the frequency of the ripple within a specified frequency range. The frequency can periodically increase and/or decrease within the specified frequency range, for example. A sinusoidal variation of the ripple frequency within the specified frequency range, for instance, is possible too. Any other principles for varying the frequency for the ripple component within a specified frequency range are of course possible as well.

The ripple component, which is superimposed on the control variable d, can have any signal shape. Possible are in particular rectangular, triangular, saw-toothed or sinusoidal ripple components, for example.

The amplitude of the ripple component can be kept constant over the entire the control range, for example. The amplitude of the ripple component can furthermore also be varied, if necessary. It is possible, for instance, to increase the amplitude of the ripple component in the region of the expected dead time region. However, any other schemes for adjusting the amplitude of the ripple component are generally possible as well. The amplitude of the ripple component should in particular always be selected to be at least large enough that, even within the dead time region, the dead time region can be left at least partially by superimposing the control variable d with the ripple component.

The preceding statements described the principle of control for a circuit arrangement comprising a single dual active bridge converter 1. It is additionally generally also possible to apply this principle to circuit arrangements comprising a plurality of dual active bridge converters connected in parallel. In a circuit arrangement comprising a plurality of dual active bridge converters connected in parallel, the ripple component with which the control variables are superimposed can in particular be selected to be different for the individual dual active bridge converters.

FIG. 4 shows a schematic illustration of a flowchart as it forms the basis of a method for operating a dual active bridge converter 1 according to one embodiment. In principle, the method can comprise any of the steps previously described in connection with the dual active bridge converter 1. The above-described dual active bridge converter can analogously also include any components for implementing the method described in the following.

A control variable d for operating the dual active bridge converter 1 can be determined in a first step. Determining can, for example, include receiving the control variable from an external control device. It is additionally or alternatively also possible to determine the control variable d on the basis of one or more further target values and/or measured values. In Step S2, the determined control variable d can be superimposed with a ripple component. The possibilities already discussed above apply for the ripple component with which the control variable d is superimposed. Lastly, in Step S3, the dual active bridge converter 1 can be controlled using the control variable d superimposed with the ripple component.

In summary, the present invention relates to the control of a dual active bridge converter. It is in particular provided that a control variable for the dual active bridge converter be superimposed with an additional ripple component and that the dual active bridge converter be controlled with a combination of the control variable and the additional ripple component.

The invention claimed is:

1. A method for operating a dual active bridge converter (1), the method comprising:
   determining (S1) a control variable (d) as a phase shift for the dual active bridge converter (1);
   superimposing (S2) the control variable (d) with a ripple component; and
   controlling (S3) the dual active bridge converter (1) using the control variable (d) superimposed with the ripple component,
   wherein the ripple component includes a periodic quantity having a predetermined signal shape, and
   wherein an amplitude of the ripple component is selected to be at least large enough that a stagnation of the control variable when passing through a dead time region is avoided.

2. The method according to claim 1, wherein the predetermined signal shape comprises a sinusoidal signal profile, a triangular signal profile, or a saw-toothed signal profile.

3. The method according to claim 1, wherein the ripple component has a fixed predetermined frequency.

4. The method according to claim 1, wherein a frequency of the ripple component is varied periodically within a predetermined frequency range.

5. The method according to claim 1, wherein an amplitude of the ripple component is set using a current value of the control variable (d).

6. A dual active bridge converter (1) comprising a control device (40) which is configured to determine a control variable (d) as a phase shift for the dual active bridge converter (1), to superimpose the control variable (d) with a ripple component and to control the dual active bridge converter (1) using the control variable (d) superimposed with the ripple component, wherein the ripple component includes a periodic quantity having a predetermined signal shape, and wherein an amplitude of the ripple component is selected to be at least large enough that a stagnation of the control variable when passing through a dead time region is avoided.

7. The dual active bridge converter according to claim 6, wherein the dual active bridge converter (1) includes a primary side, a transformer, and a secondary side.

8. The dual active bridge converter according to claim 7, wherein the primary side includes a first half bridge including two switching elements (M1$p$, M2$p$) and a second half bridge including two switching elements (M3$p$, M4$p$).

9. The dual active bridge converter according to claim 7, wherein the secondary side includes a first half bridge including two switching elements (M1$s$, M2$s$) and a second half bridge including two switching elements (M3$s$, M4$s$).

10. The dual active bridge converter according to claim 6, wherein the phase shift is between the control on an input side and an output side of the dual active bridge converter.

11. The method according to claim 1, wherein the phase shift is between the control on an input side and an output side of the dual active bridge converter.

12. A voltage converter arrangement comprising at least one dual active bridge converter (1) having a control device (40) which is configured to determine a control variable (d) as a phase shift for the dual active bridge converter (1), to superimpose the control variable (d) with a ripple component and to control the dual active bridge converter (1) using the control variable (d) superimposed with the ripple component, wherein the ripple component includes a periodic quantity having a predetermined signal shape, and wherein an amplitude of the ripple component is selected to be at least large enough that a stagnation of the control variable when passing through a dead time region is avoided.

13. The method according to claim 1, wherein the predetermined signal shape is a rectangular signal profile.

14. The voltage converter arrangement according to claim 12, wherein the dual active bridge converter (1) includes a primary side, a transformer, and a secondary side.

15. The voltage converter arrangement according to claim 14, wherein the primary side includes a first half bridge including two switching elements (M1$p$, M2$p$) and a second half bridge including two switching elements (M3$p$, M4$p$).

16. The voltage converter arrangement according to claim 14, wherein the secondary side includes a first half bridge including two switching elements (M1$s$, M2$s$) and a second half bridge including two switching elements (M3$s$, M4$s$).

17. The voltage converter arrangement according to claim 12, wherein the phase shift is between the control on an input side and an output side of the dual active bridge converter.

* * * * *